United States Patent
Navarra Pruna

(10) Patent No.: US 6,722,273 B1
(45) Date of Patent: Apr. 20, 2004

(54) SEQUENTIAL NUMBERING MACHINE FOR INJECTION MOULDS

(75) Inventor: Alberto Navarra Pruna, Sant Just Desvern (ES)

(73) Assignee: Comercial de Útiles y Moldes, S.A. (ES)

( * ) Notice: Subject to any disclaimer, the term of this patent is extended or adjusted under 35 U.S.C. 154(b) by 0 days.

(21) Appl. No.: 10/304,165

(22) Filed: Nov. 25, 2002

(51) Int. Cl.[7] .......................... B41C 45/00; B41J 27/00; B28B 1/00
(52) U.S. Cl. .................. 101/72; 101/108; 101/111; 101/110; 425/175; 425/183; 425/185; 425/450.1; 425/451.4
(58) Field of Search ............................ 101/72, 108, 111, 101/110; 425/175, 450.1, 451.4, 183, 185

(56) References Cited

U.S. PATENT DOCUMENTS

| | | | | |
|---|---|---|---|---|
| 3,566,783 A | * | 3/1971 | Price | 101/108 |
| 4,379,687 A | * | 4/1983 | Wilson et al. | 425/388 |
| 4,428,725 A | * | 1/1984 | Babiol | 425/556 |
| 4,539,906 A | * | 9/1985 | Ogura | 101/99 |
| 5,057,000 A | | 10/1991 | Mangone, Jr. | 425/190 |
| 5,318,418 A | * | 6/1994 | Netto | 425/150 |
| 6,129,016 A | * | 10/2000 | Rehkemper et al. | 101/327 |

FOREIGN PATENT DOCUMENTS

| | | |
|---|---|---|
| DE | 3000780 | 7/1981 |
| DE | 19502564 | 8/1996 |
| DE | 19615280 | 10/1997 |

* cited by examiner

Primary Examiner—Charles H. Nolan, Jr.
Assistant Examiner—Marvin P Crenshaw
(74) Attorney, Agent, or Firm—Ostrolenk, Faber, Gerb & Soffen, LLP

(57) ABSTRACT

The numbering machine comprises a series of cams (2) and a series of wheels (3), each cam (2) being connected with a wheel (3), so that the turning of a cam (2) signifies the turning of a wheel (3). The cams (2) have on their periphery nine projections (17) and a recess or hollow (18), while each wheel (3) has on its periphery the digits corresponding to the first nine numbers. The assembly is mounted in an interior casing (1) from which a spindle (4) emerges operable sequentially in each process of injection of a piece, so that through that spindle (4) and by means of a lever (8) articulated thereto individual arms (10) and (11) are operated, the first of them having a toothed sector (14) the teeth of which are pushed for each tooth to press on a single cam (2) until the complete turn takes place, the interlocking taking place of a second tooth with the second cam (2) and so forth, so that in each sectorial turning of the cam (2) the sectorial turning of the respective wheel takes place (3) and therefore the sequential advance of the corresponding number. The arm (11) has a series of prongs (15) which maintain the wheels (3) immobilised with the exception of that which is operated by the corresponding cam (2). The numbering machine is foreseen for marking pieces obtained by injection.

16 Claims, 9 Drawing Sheets

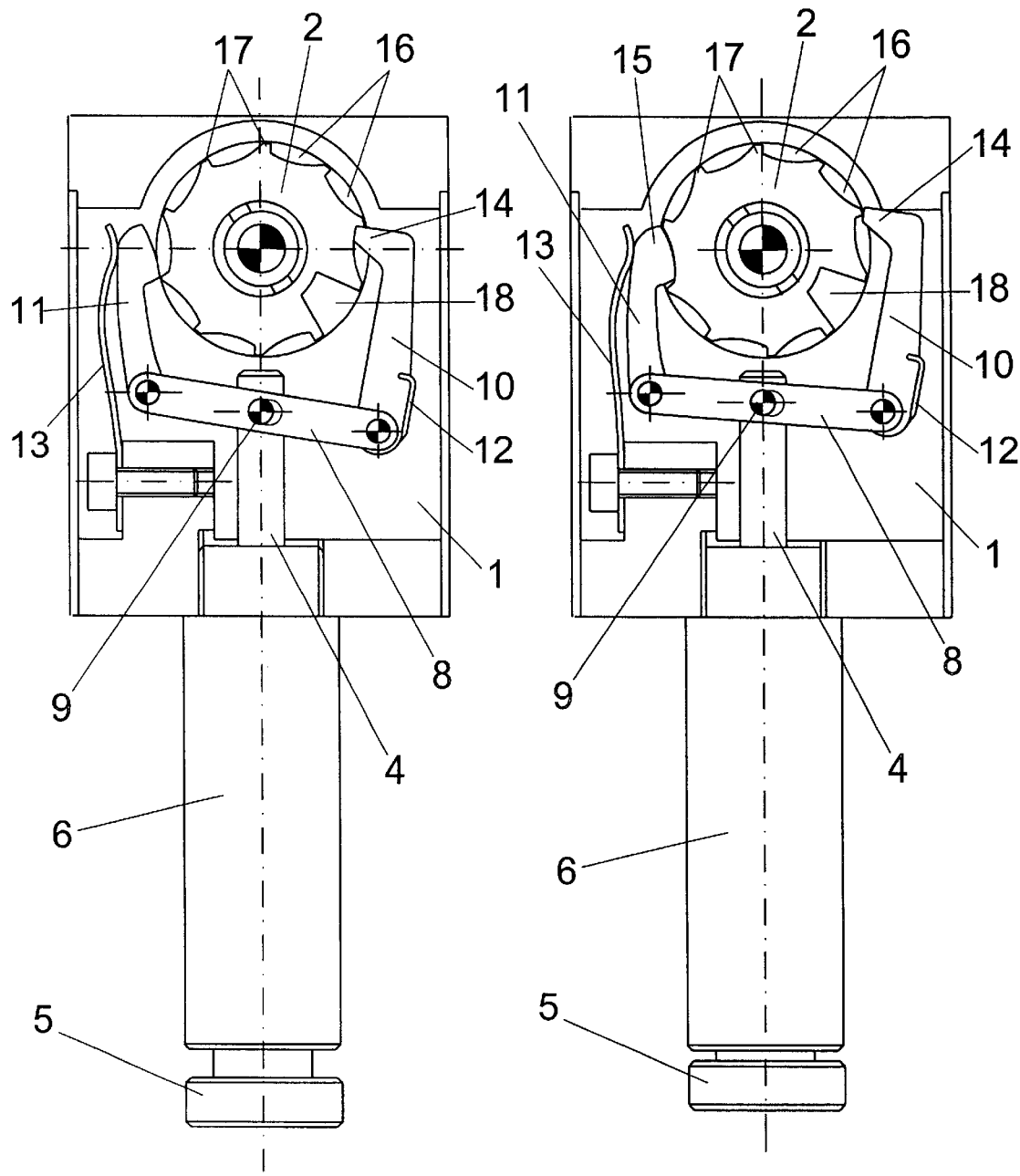

SEQUENTIAL NUMBERING MACHINE FOR INJECTION MOULDS

OBJECT OF THE INVENTION

The present invention relates to a sequential numbering machine for injection moulds, the evident purpose of which is that of marking pieces which are obtained by injection moulding, so that the numbering machine acts in accordance with each electromechanical impulse which it receives in each injection cycle, or what is the same thing, in each injection moulded piece.

It is an object of the invention to provide the plastics injection sector with a sequential numbering machine in order to be able to mark the pieces which are being obtained by injection, the operation being carried out automatically without the numbering machine being subjected to filtrations of plastic during the injection process, avoiding thereby possible jamming and malfunctioning.

BACKGROUND OF THE INVENTION

Numerous types of numbering machines are known for carrying out marking of different kinds, from marking with letters, to numbers, signs, logotypes, etc., so that the change from numbers or symbols is carried out manually by means of turning a lever which will give rise to the turning of the wheel bearing the numbers, to obtain the figure that is wanted.

Nevertheless, although numerous types and forms of numbering machine exist for the marking of different pieces, objects and articles, no numbering machine is known in the plastic injection sector, which is simply due to the difficulty involved basically in achieving a level of total sealing, so that the plastic is not introduced in the injection process through the multiple moving pieces and spaces existing in the numbering machines marketed at the moment.

DESCRIPTION OF THE INVENTION

The numbering machine proposed, is foreseen precisely to resolve the problem explained above, being based on the adequate arrangement and operation of the cams and wheels which combine to form the numbering machine, all this enclosed in a cylindrical casing from which emerges a spindle finished in a plunger which is operated by electromechanical impulses, which spindle being associated with a spring which tends to constantly push it outward in order that the electromechanical impulse presses toward the interior and acts on a transversal lever mounted so that it can rotate about the spindle's end, which end being housed inside the cylindrical casing like the lever, which has on each of its ends an arm mounted also so that it can rotate but pushed constantly, in one case toward the cams of the numbering machine and in the other case toward the wheels of the numbering machine itself.

The cams and the wheels are connected in pairs, so that the sectorial turning of a cam signifies the turning of the wheel associated therewith, the turning of each cam and therefore of each wheel being independent, with the particularity that an axle exists on one of whose halves is mounted the wheel assembly and on the other half the cam assembly, the outermost cam of one side and the outermost wheel of the opposite one being connected on the axle itself, so that the turning of that cam signifies the turning of the wheel. Likewise, the cam adjacent and more internal to that previously referred to is connected with the wheel adjacent to that of the other end, so that the turning of that second or more internal cam, signifies the turning of the second wheel and so forth, so that each wheel and cam are connected to each other by means of a cylindrical shell, the different cylindrical shells which constitute the means of linking between wheels and cams being concentric.

One of the arms articulated on the corresponding end of the lever previously referred to, is finished in a toothed heel, with the teeth arranged in a stepped manner, including as many teeth as the number of cams and wheels comprising the counter, which will correspond specifically with the number of figures it is desired to number, so that if the figure it is desired to mark on a piece is six, it will incorporate six cams, six wheels and, the arm or toothed heel of the latter, six teeth.

As mentioned, that arm is pressed by means of a spring or band toward a position of pushing against the cams.

Each of the cams has nine peripheral recesses, which correspond to the first nine numbers, and an inlet, so that the recesses are defined by corresponding projections against which will press one of the teeth of the toothed heel, all this so that every time the plunger receives an electromechanical impulse, the axial displacement which the spindle associated with that external plunger undergoes, signifies the rocking of the lever and corresponding thrust of the arm bearing the toothed heel, and with this the partial turning of the cam, the angular segment of turning being that which is defined between each pair of consecutive projections, so that the turning of the cam in question will signify the turning of the corresponding wheel, the rest remaining immobilised as a consequence of a positional lock with which, for this purpose, the arm foreseen on the opposed end of the other lever is fitted, that positional latch being also pressed by a spring or band toward a position of pushing against the numbered wheels, and equipped with as many prongs as wheels, so that each prong presses on a wheel and maintains it immobilised during the turning of the cam which is operated by the toothed sector of the other arm, the thrust from this arm being greater than the thrust on the positional lock in order to allow the turning of each cam and, however, to maintain the remaining numbered wheels immobilised.

Each sector through which the cam rotates, will correspond to the advance of a number of the corresponding wheel, and therefore in each cycle a figure will be stamped, and in the following cycle the figure immediately higher, and so forth, until when the cam has turned through the nine sectors comprised between the different projections, the toothed sector reaches the hollow of said cam, in which all said toothed sector of the arm is positioned, so that in the following cycle and corresponding rocking of the lever, the engagement commences of the next tooth of the toothed sector on the second cam, which will signify the turning of the latter and with it that of the second wheel, until conclusion of the numbering of this second wheel and so forth, continuing with the third, etc.

The cylindrical casing from which only the spindle emerges with the spring guided in a sheath, and which spindle is finished in the corresponding plunger, presents the particularity that in the opposite end or upper part of said body or cylindrical casing, an opening has been foreseen coincident with the numbers, symbols or figures foreseen on the wheels, which permits the marking of each injected plastic piece.

The numbered wheels foreseen on the ends of the assembly are wider than the intermediate ones to avoid possible filtrations of plastic through those sides, whereby the necessary sealing is achieved for this application, also at that point.

The sequential numbering machine also allows diverse alternatives, since the numbers can be located on the numbered wheel in a planar or concave manner.

Finally, it is mentioned that in a variant or alternative embodiment, the numbering machine can incorporate a second counter which would allow multiplying by "X", the numbering capacity of the numbering machine itself, so that said second counter is moved manually and would be mounted in a space foreseen for this purpose in the upper part of the general cylindrical casing of the numbering machine, with the disposition of some O-rings which avoid or brake the position and do not rotate in free motion.

DESCRIPTION OF THE DRAWINGS

To complete the description being made and with the object of assisting in a better understanding of the characteristics of the invention, the present descriptive specification is accompanied with a set of drawings, as an integral part thereof, wherein, by way of illustration and not restrictively, the following has been represented:

FIG. 3 shows a view like that of the previous figure, but with the plunger worked according to a displacement corresponding to 50% thereof, in which displacement the thrust of the toothed sector is produced on the corresponding cam and the partial turning thereof.

FIG. 4 shows a view like that of the previous figure wherein the plunger has been pushed to the limit, occurring at that moment the release of the toothed sector with respect to the corresponding cam.

DETAILED DESCRIPTION OF EMBODIMENTS OF THE INVENTION

Figure 1:
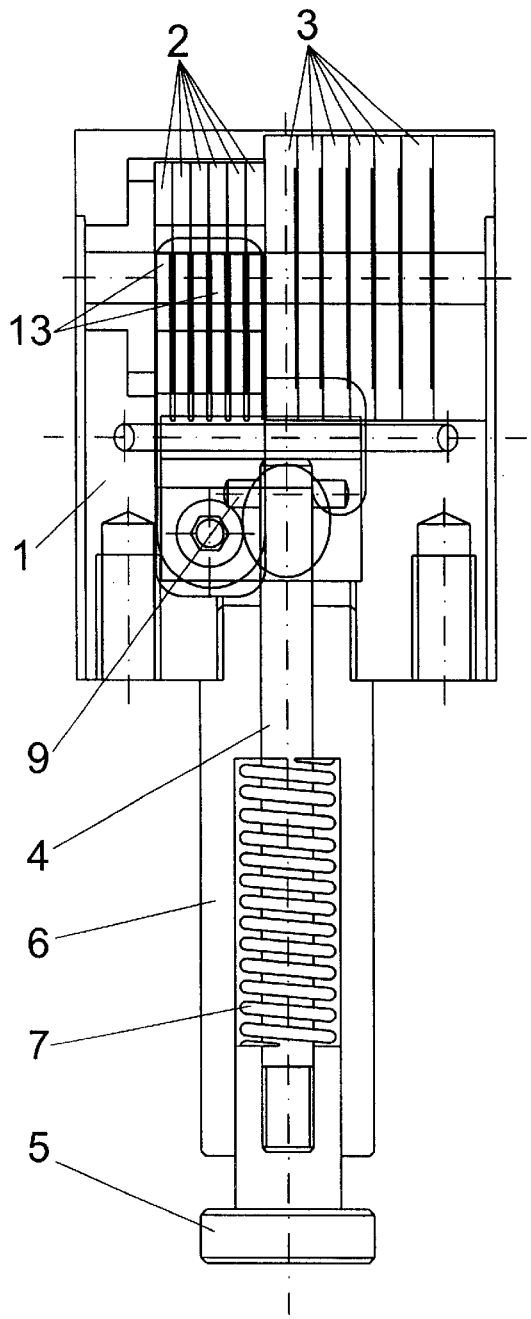
FIG. 1 shows a schematic representation according to a side elevation of the sequential numbering machine for injection moulding according to an embodiment of the invention.

In the light of the aforementioned figures, it can be observed how the sequential numbering machine for injection moulds is constituted from a cylindrical and hollow body (1) serving a general casing on the interior of which is mounted a series of cams (2) and a like number of wheels (3), the latter bearing on their periphery the first nine numbers, located in sequential order on the circumferential contour of said wheels (3).

The cams (2) form an assembly which is located to one side with respect to the assembly which the wheels (3) form, the number of cams and of wheels being the same and will depend logically on the digits of the corresponding figure to be marked.

From the cylindrical body (1) a spindle (4) emerges axially being finished in a plunger (5), said spindle (4) being housed in its greater part in a guide (6) in which is housed in turn a spring (7) which tends to constantly push the aforementioned spindle (4) outward, with the particularity that on the internal end of the latter is hinged a lever (8) capable of pivoting about the articulation pin or assembly (9) of such lever (8) with respect to the end of the spindle (4), such lever (8) having on each of its ends individual arms (10) and (11), the first of them constantly thrust by a spring (12) against the periphery of the cams (2), whilst the arm (11) is also thrust constantly by another spring (13) against the periphery of the toothed wheels (3), all in a such way that in each injection process to obtain a plastic piece, the described numbering machine will be subjected to an impulse that presses on the plunger (5), producing the axial displacement inward of the latter against the spring or band (7). The arm (10) is finished at its free end in a toothed sector (14) which has its teeth in a stepped manner, so that only one of them presses on a cam (2), with the particularity that the number of teeth of that sector (14) will be the same as the number of cams (2) and therefore of numbered wheels (3).

Figure 2:
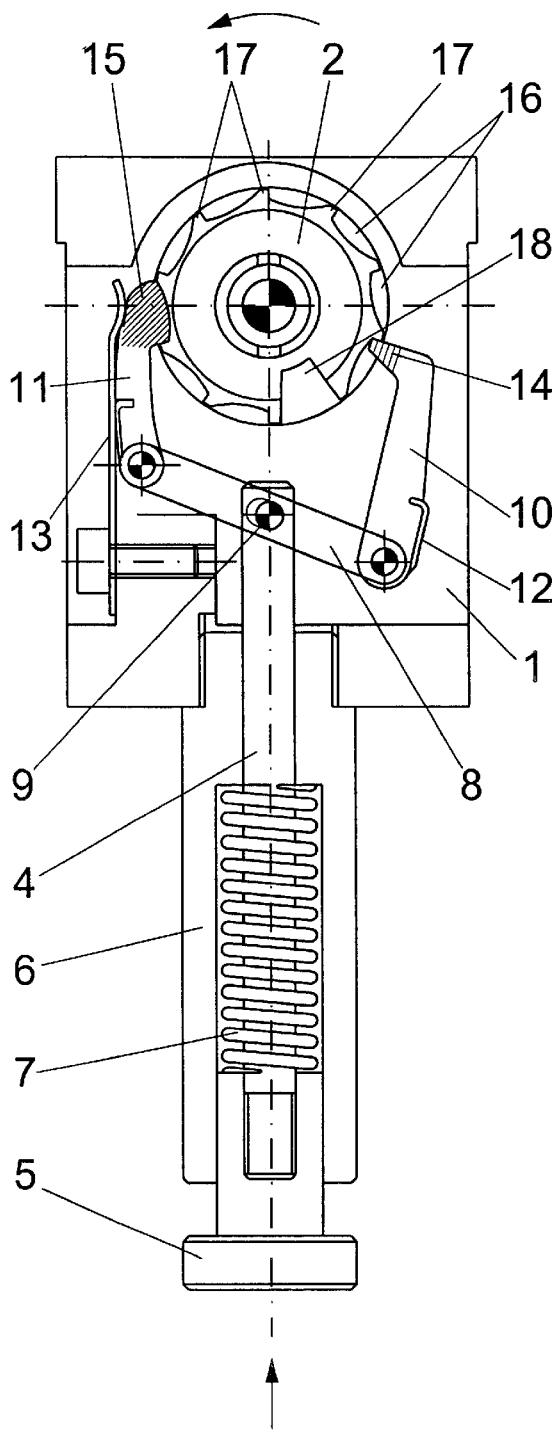
FIG. 2 shows another view in elevation of the same numbering machine as in the previous figure, but seen frontally, allowing the levers and the arms to be seen which act to carry out the operation of the numbering machine.
Figure 5:
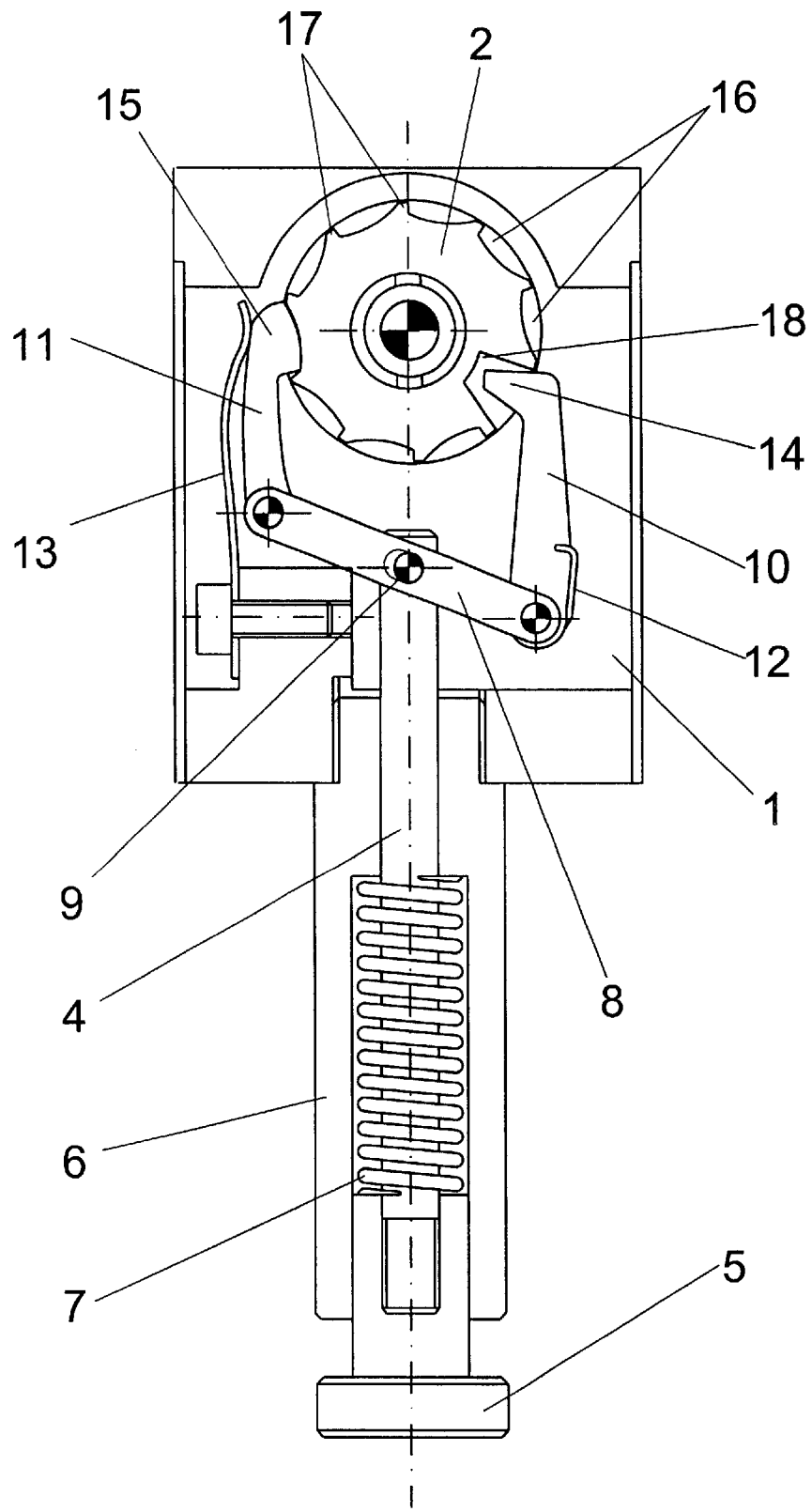
FIG. 5 shows a view like that of the two previous figures wherein the toothed sector foreseen on the arm operable by the lever articulated on the spindle of the plunger has reached the hollow of the cam, in order to allow the initial turning to take place of a second cam and therefore of a second numbered wheel.

For its part, the arm (11) is finished on its end in a like number of prongs (15), only the outermost prong (15) being shown in FIG. 2, the function of which will also be explained later.

Each of the cams (2) has on its periphery nine concave inlets (16) separated by respective projections (17), it being on the latter on which presses the corresponding tooth of the toothed sector (14), so that in the operation of the lever (8) and therefore of the arm (10) signifies the pushing and turning of the respective cam (2), all in a such way that the number of projections (17) and therefore of inlets (16) will be nine, each cam (2) also including a wide recess or hollow (18) wherein the toothed sector (14) will be lodged every time that the cam (2) rotates through 360°.

Figure 6:
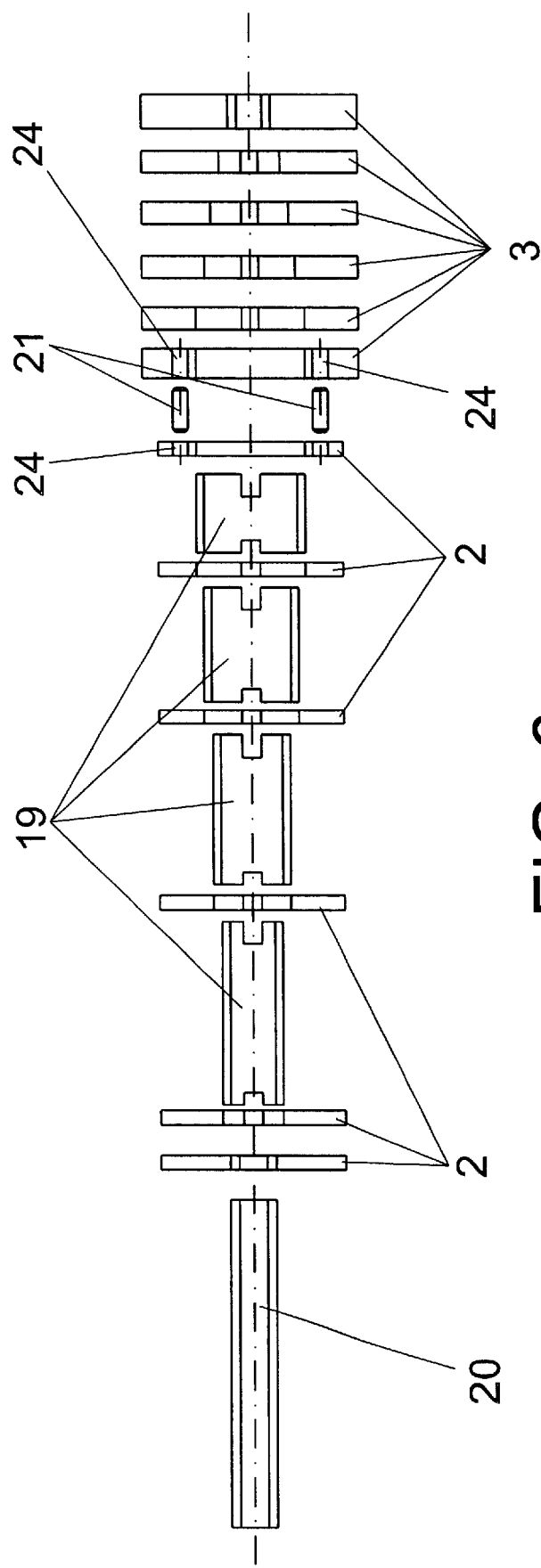
FIG. 6 shows an exploded side view of the wheels and cams, as well as the elements which connect them, so that the number of cams is six and therefore the number of numbered wheels will also be six, although depending on the figure which it is desired to obtain, that number will be greater or smaller.
Figure 7:
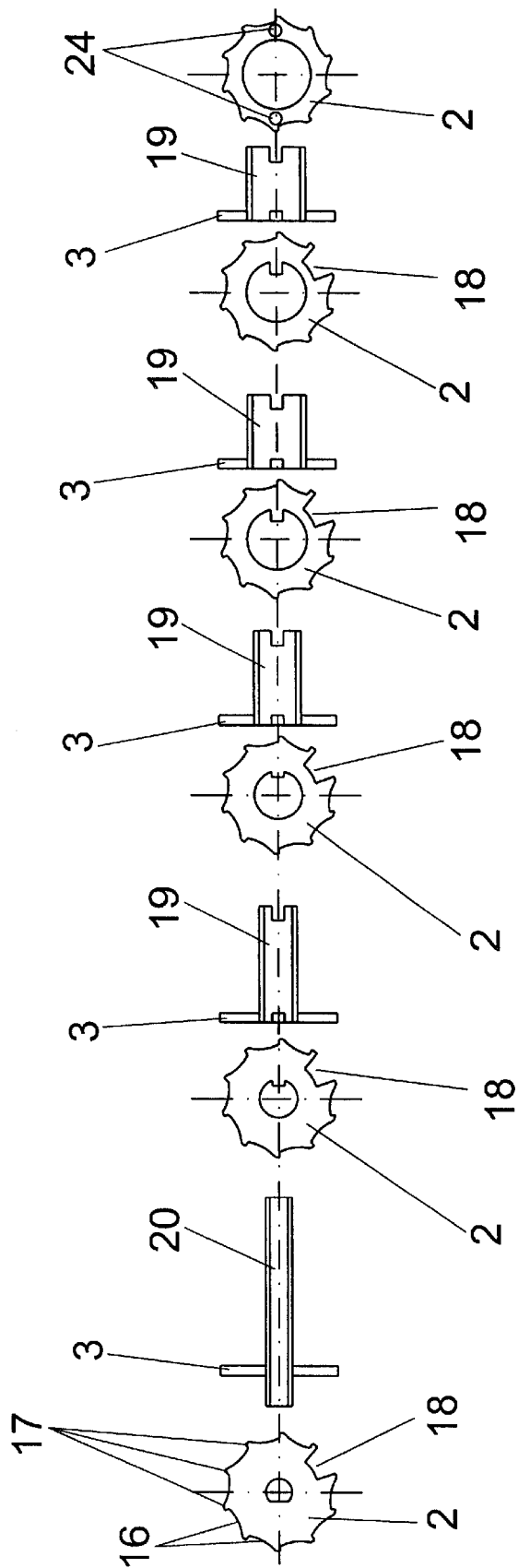
FIG. 7 shows another exploded view of the cams inserted between the wheels, with the corresponding shells or elements which have to connect each cam with its respective wheel.
Figure 8:
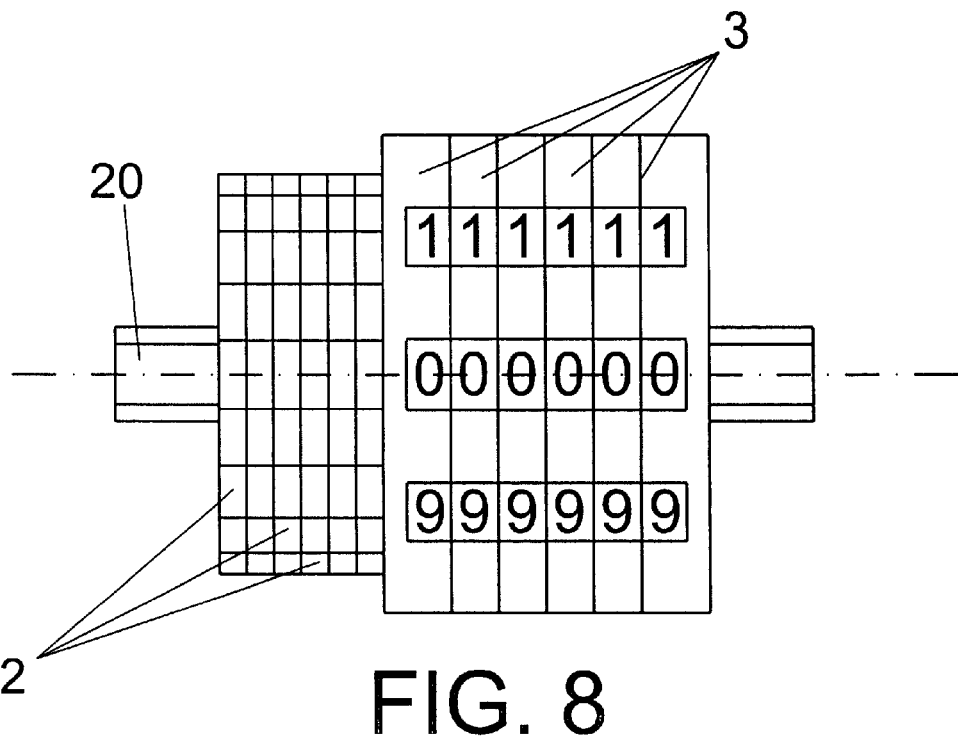
FIG. 8 shows a side view of the assembly of the wheels and cams on the corresponding axle.
Figure 9:
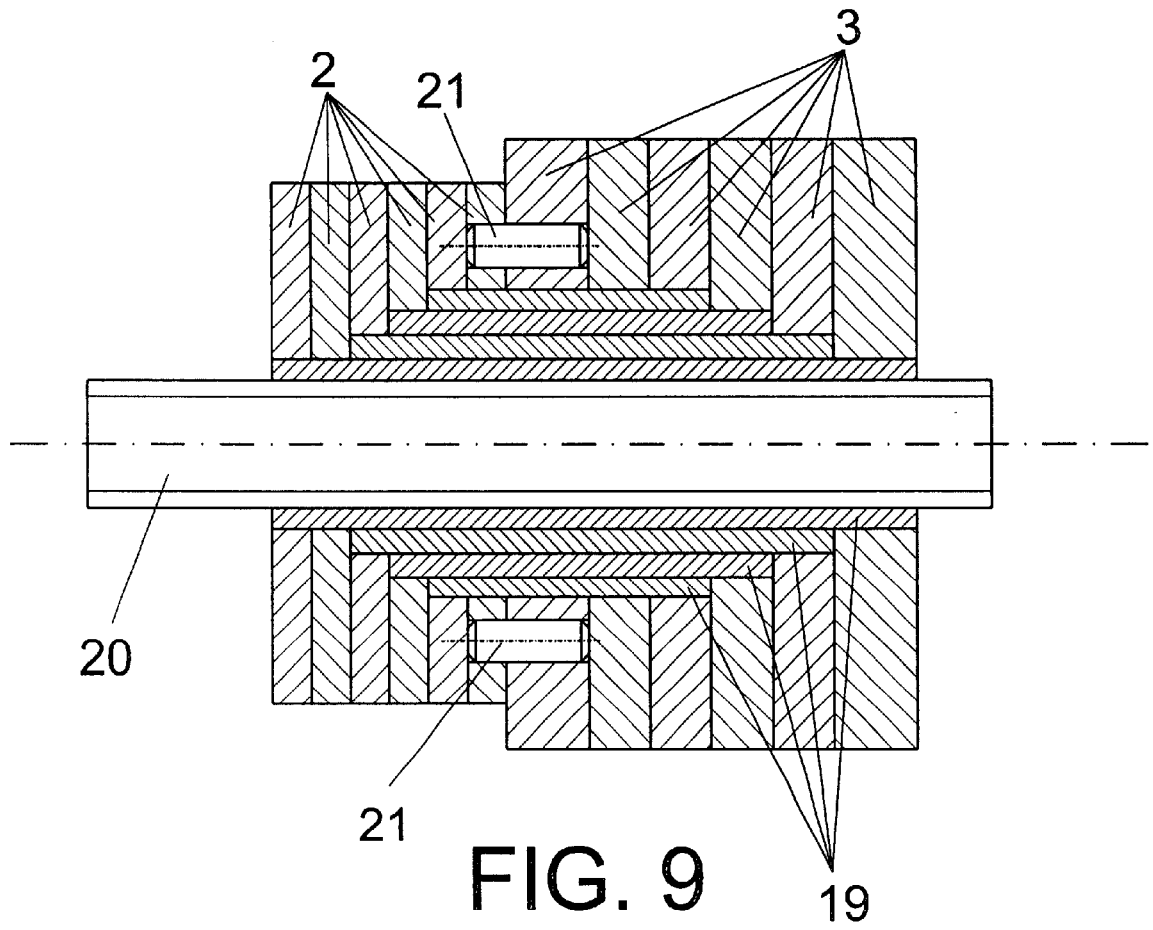
FIG. 9 shows a view in longitudinal cross-section of the assembly represented in the previous figure.

Each cam (2) is joined to a single wheel (3), so that in its assembly the turning of a cam (2) signifies the turning of the respective wheel (3) to which it is linked, said linking being determined by a series of shells (19) which are mounted concentrically to each other and in turn concentrically to an axle (20) on which are firmly mounted an outermost cam (2)

and the wheel (3) of the opposite end, as is represented in FIG. 9, with the particularity that the next cam (2), that is the adjacent one to the previously referred to outermost cam, is connected with the wheel (3) adjacent to the outermost one, through the shell (19) of greatest length, and so forth, the innermost cam (2) and wheel (3) being connected to each other through corresponding pins (21). Thus, every time that a cam (2) rotates, its corresponding wheel (3) will rotate simultaneously, by virtue of each wheel being linked to a single cam, as mentioned previously and as is represented in FIG. 9, the arrangement of said elements being seen in FIGS. 6 and 7, that is, cams (2), wheels (3) and elements which connect them in pairs and which are referred to with the numbers (19), (20) and (21).

Figure 10:
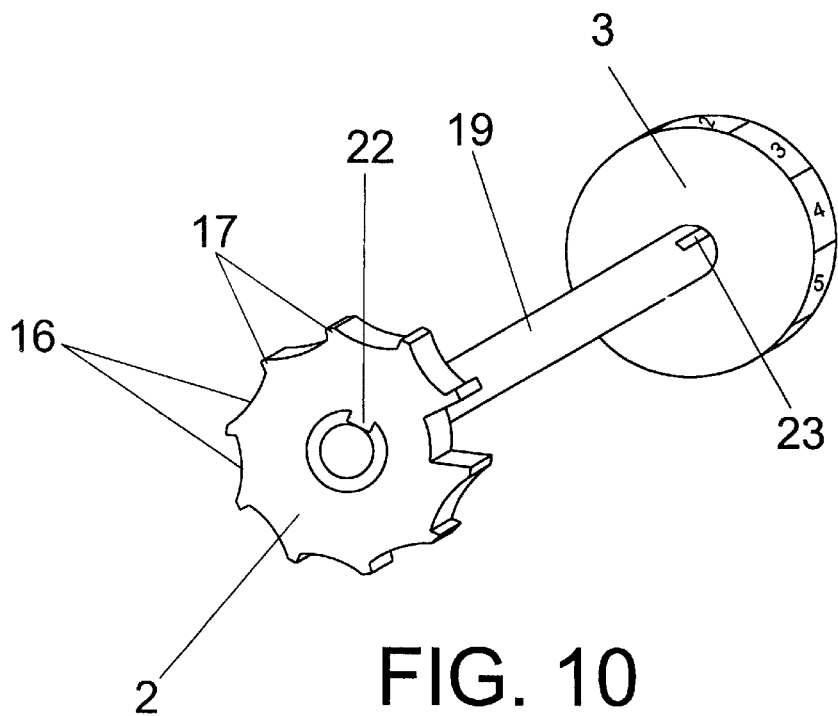
FIG. 10 shows an exploded view of a cam and the wheel which has to be associated therewith, as well as the corresponding shell which will connect them, through a projection of the cam and a notch in the shell.

The coupling of said elements, as is represented in FIG. 10, is carried out by means of an internal radial projection (2), which each cam (2) incorporates, which is positioned in a notch or slot (23) foreseen for this purpose in the corresponding wheel (3), with the exception, logically, of the first outermost cam (2) which is coupled, as well as the respective wheel, by keying to the axle (20), whilst the intermediate cam (2) and corresponding wheel (3) are coupled by the pins or pivots (21) which are lodged in hollows (24) of the former.

In accordance with the characteristics referred to, the operation of the numbering machine is as follows:

Every time that the plunger (5) receives an impulse, produced in each injection cycle, that is, for each piece which is obtained by injection, the arm (10) driven by the lever (8) linked to the spindle (4) of the plunger (5) is moved and one of the teeth of the toothed sector (14) acts on a projection (17) of a cam (2), the latter rotating through a segment or sector that corresponds to the angular sector defined between each two projections, which is the thrust made by the tooth of the toothed sector (14) on the projection (17) corresponding to the cam (2). That partial turning of the cam (2) signifies the partial turning of the respective wheel (3), with no possibility that the remaining wheels rotate. Meanwhile, the prongs (15) of the arm (11) foreseen on the opposite end of the lever (8), are acting on the wheels (3), impeding the turning thereof, so that since the thrust produced by the spring (12) is greater than that produced by the spring (13), only the cam (2) will rotate and therefore the corresponding wheel (3) through actuation of the corresponding tooth of the toothed sector (14) of the arm (10), whereby the prongs (15) of the arm (10) act as a means of positional locking of the wheels, preventing these from rotating whilst the turning of a cam and its corresponding wheel is taking place.

As already said, on each impulse the turning is produced of the cam (2) and of the corresponding wheel, through one sector, the partial turning being repeated with each piece obtained in an injection cycle, until the tooth of the toothed sector (14) has passed over all the projections (17) of that cam, reaching the recess or hollow (18) wherein all the toothed sector (14) is lodged, whereby at that moment the cam (2) is released which had been operated, so that on the next impulse, the second tooth of the toothed sector (14) presses on the corresponding projection (17) of the second cam (2), the turning of this taking place as in the previous case by sectors and of the corresponding wheel (3), and so forth, so that each complete turn of a cam and its corresponding wheel produces the advance of a tooth over the respective and sequential cam, until the last tooth of the toothed sector (14) presses logically on the last cam (2). The spring (13) which it had been stated previously acts on the arm (14), what in fact it acts on is on each of the prongs (15), that is, there is a spring or band (13) for each prong (15) for the purpose of impeding the turning of all the wheels with the exception of that which is linked to the respective cam (2) which is at that moment being operated.

Figure 11:
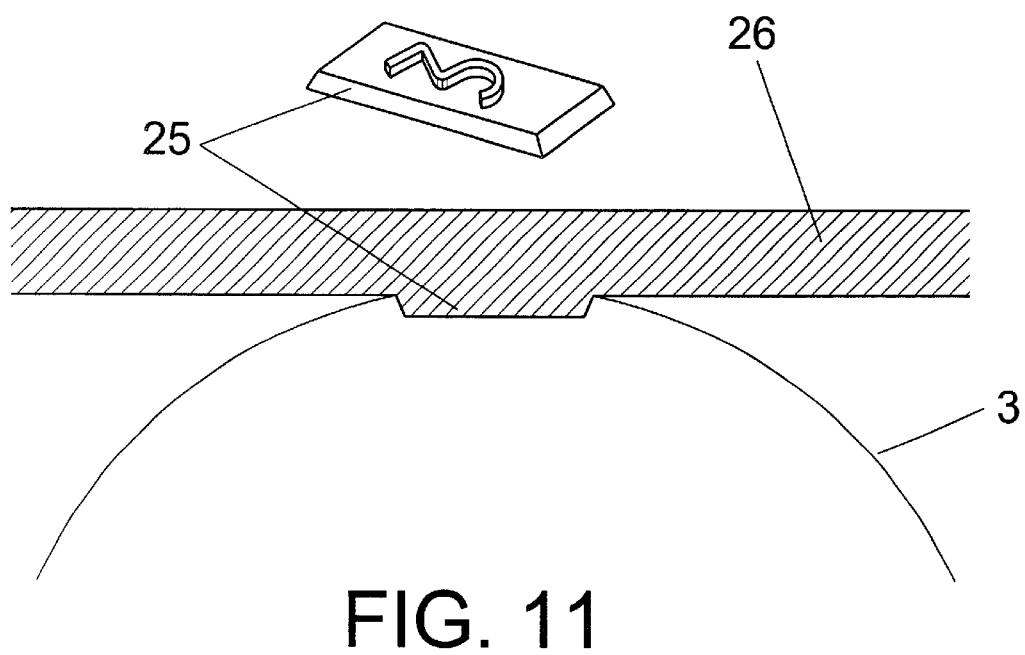
FIG. 11 shows a detail in cross-section of the upper part of a wheel marking a plastic piece.

The marking is carried out as a consequence of an open or hollow part established on the upper part of the casing or cylindrical body (1), in correspondence with the numbering (25) of the wheels (3), permitting therewith the marking of each injected plastic piece (27) by means of the marker (25) defined by the corresponding numbers, which logically can be symbols, graphics, etc., with the particularity that said numbers, such as is represented in FIG. 11, can be arranged on the wheel (3) in a planar manner although they could also be concave in form.

Figure 12:
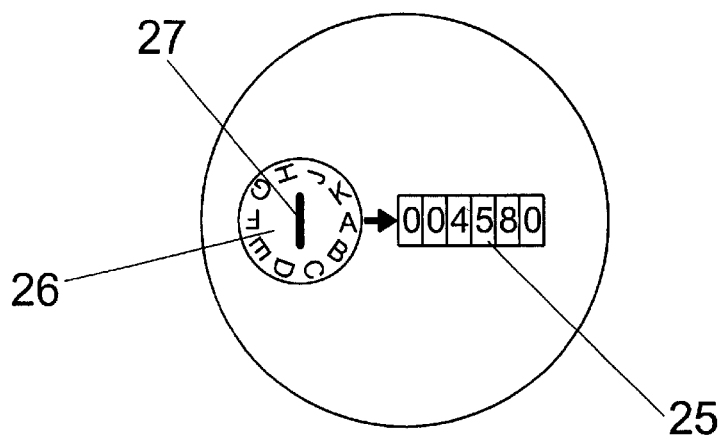
FIG. 12 shows a plan view of an alternative embodiment of the numbering machine with a second counter.

In an alternative embodiment, the numbering machine can incorporate a second counter (26), as is represented in FIG. 12, allowing multiplication by "X", of the first counter or numbering machine, depending on the number of symbols, letters or numbers which that second counter (26) has.

Figure 13:
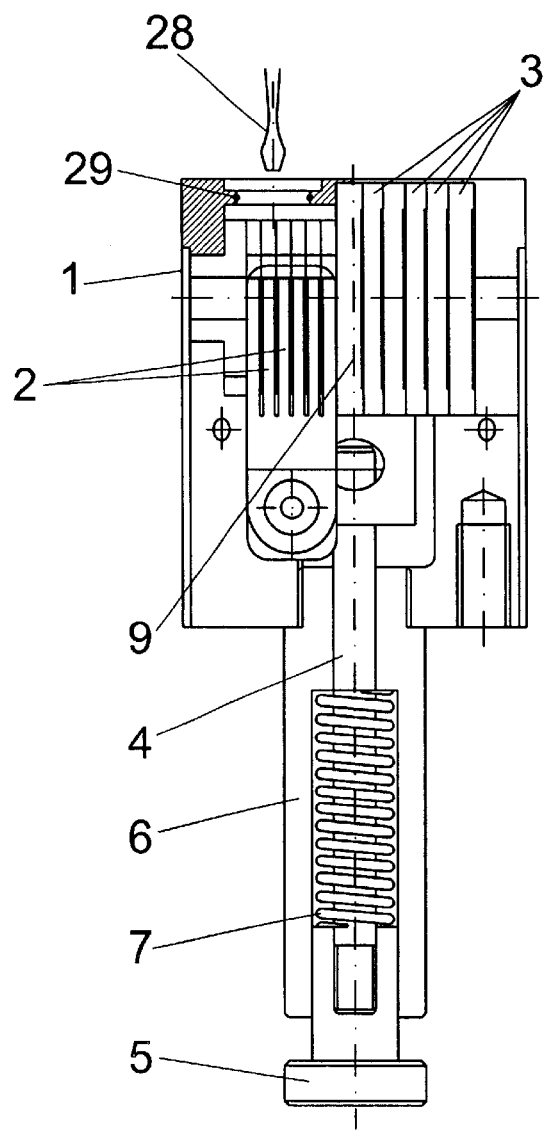
FIG. 13 shows a view in cross-section corresponding to the form of assembly of the additional counter which is included in the numbering machine represented in the previous figure.

The assembly of that second counter (26) is carried out in a space established for this purpose in the upper part of the casing (1), as is represented in FIG. 13, being secured by means of screws which are inserted by means of an appropriate tool (28) like a screwdriver, being sealed by means of O-rings (29) to avoid the braking of the position and which does not rotate in free motion.

Figure 14:
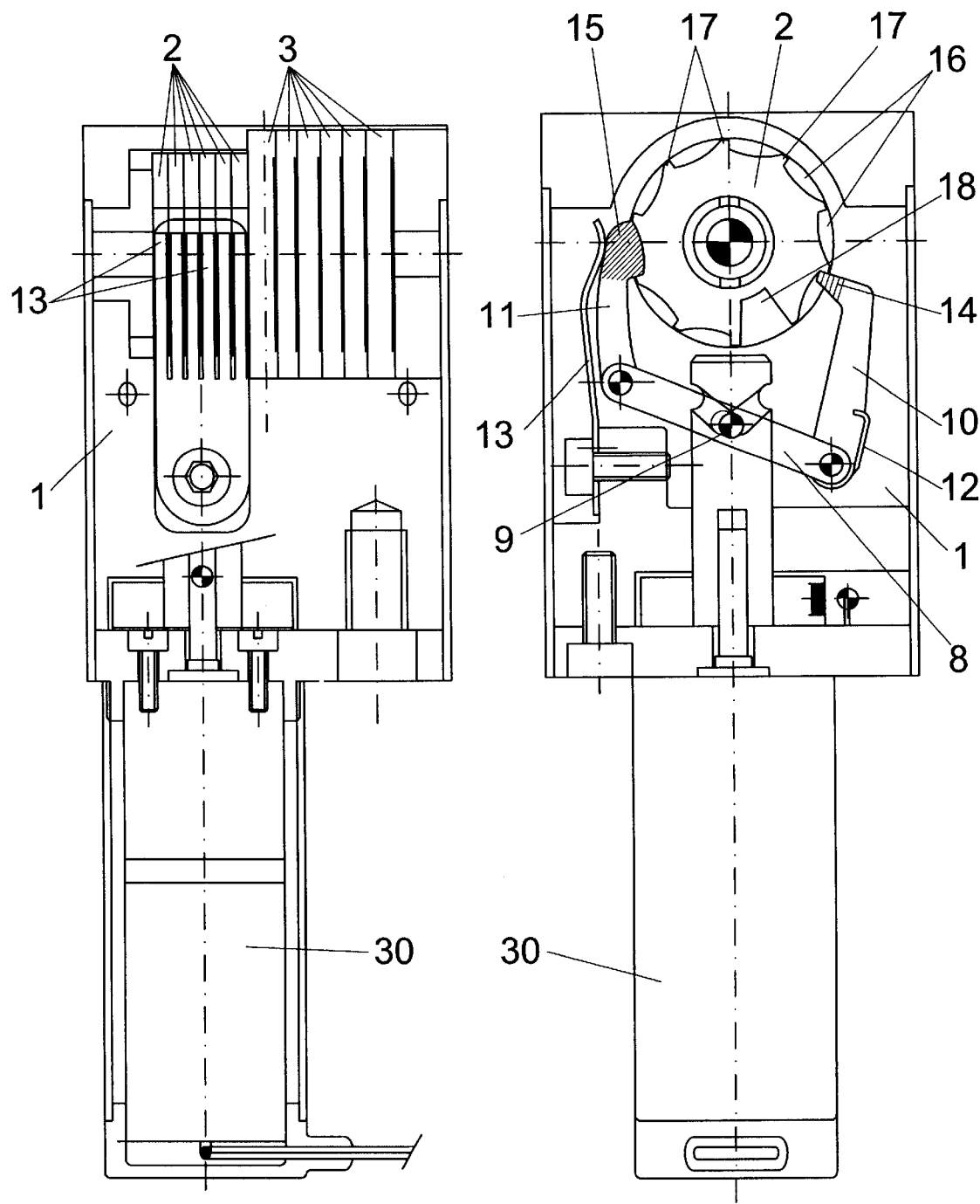
FIG. 14 shows a representation similar to the assembly like that of FIGS. 1 to 5 wherein the movement of the actuator is made by means of an electromagnet instead of mechanical impulses.

Lastly FIG. 14 represents a similar actuator to that of the initial figures deposited in said invention, wherein the actuator, instead of being used in a mechanical way, the plunger (5) has been substituted by an electromagnet (30) as is shown in such figures.

In identical manner to that in which this electromagnet or a mechanical device is used, it can be easily understood that this mechanism can be substituted by electrical impulses or by motors or by equivalent means that carry out that same function.

What is claimed is:

1. Sequential numbering machine for injection moulds, for carrying out marking on pieces obtained by injection moulding, the marking being carried out sequentially on each piece and the numbering machine acting automatically, said numbering machine comprising:

a cylindrical and hollow casing in which are housed a plurality of cams and a like number of wheels mounted collaterally with each other forming two assemblies, each cam being connected to a respective one of said wheels, so that the turning of each cam signifies the turning of the respective wheel;

from the casing a spindle emerges to the exterior of the casing;

mounted on the internal end of said spindle is a lever which on its end has individual articulated first and second arms, the first arm having an outer toothed sector, and the second arm having a plurality of prongs, the first arm being arranged for pressing on the cams whilst the prongs are arranged for pushing on the wheels;

wherein each impulse which the spindle receives corresponds to a linear displacement of the spindle, which causes rocking of the lever and pushing of one of the teeth of the toothed sector corresponding to the first arm against one of a plurality of projections included on the periphery of each of the cams, there being defined between each pair of consecutive projections a like number of inlets, there being a hollow recess on the cam, wherein upon each complete turning of the cam, the toothed sector is introduced into the hollow recess, so that on the next impulse a second tooth presses on a second cam so that each sectorial turning of the corresponding cam signifies the partial turning of the wheel connected with that cam, the remaining wheels remaining immoblised by the pressure which is exerted thereon by the prongs.

2. Sequential numbering machine for injection moulds, according to claim 1, characterised in that an axle connects an outermost one of the cams with the wheel of the opposite end, shells connect the intermediate cams consecutively with the corresponding intermediate wheels and, the central wheel is connected with the central cam through pins, forming an assembly in which the turning of one of the cams produces only the turning of the wheel with which it is connected.

3. Sequential numbering machine for injection moulds, according to claim 2, characterised in that the intermediate cams and corresponding wheels are linked each other by means of a projection on a concentric step of the corresponding cam, which projection is positioned in a notch in the respective shell which connects the cam with its respective wheel.

4. Sequential numbering machine for injection moulds, according to claim 3, wherein the outermost cam and the corresponding outermost wheel are mounted and keyed on the axle.

5. Sequential numbering machine for injection moulds, according to claim 1, characterised in that the wheels have on their periphery, in a sequential manner, the digits corresponding to the first nine numbers, in correspondence with the nine projections and inlets established on the cams, the number of prongs being equal to the number of wheels.

6. Sequential numbering machine for injection moulds, according to claim 1, characterised in that the spindle receives mechanical impulses from a plunger which is guided in a cylindrical casing portion in which is also housed a plunger-spring which tends to constantly impel the aforementioned spindle outward.

7. Sequential numbering machine for injection moulds, according to claim 1, characterised in that the outermost wheels of the wheel assembly, define a seal to prevent filtration of plastic through the sides.

8. Sequential numbering machine for injection moulds, according to claim 1, characterised in that the wheels form a corresponding numbering machine, said sequential numbering machine further comprising a secondary counter operable manually and equipped with a series of symbols, numbers or letters, wherein the variation and the position of each of them defines a multiplication of the numbering capacity of the corresponding machine.

9. Sequential numbering machine for injection moulds, according to claim 8, wherein the secondary counter is mounted in a hollow upper area of the casing.

10. Sequential numbering machine for injection moulds, according to claim 9, wherein said hollow upper area of said casing further comprises elements for sealing.

11. Sequential numbering machine for injection moulds, according to claim 1, wherein the spindle is connected to a plunger outside the casing, the plunger being operable to apply mechanical impulses to the spindle.

12. Sequential numbering machine for injection moulds, according to claim 11, further comprising a plunger spring, wherein the plunger spring urges the plunger outward from said casing.

13. Sequential numbering machine for injection moulds, according to claim 1, wherein the spindle is connected to an electrical actuator outside the casing, the electrical actuator being operable to apply mechanical impulses to the spindle.

14. Sequential numbering machine for injection moulds, according to claim 1, wherein the first arm is compelled by a spring for constantly pressing on the cams, and the prongs on the second arm are compelled by respective springs for pushing on the wheels.

15. Sequential numbering machine for injection moulds, according to claim 14, characterized in that the spring which presses the first arm and therefore the toothed sector against the cams is of greater strength than the respective springs which push the prongs against the wheels, impeding the turning of these with the exception of that which is connected with the cam which is operated by the respective tooth of the toothed sector provided on the first arm.

16. Sequential numbering machine for injection moulds, according to claim 1, wherein each cam has nine projections.

* * * * *